(12) United States Patent
McCormick et al.

(10) Patent No.: US 8,333,087 B2
(45) Date of Patent: Dec. 18, 2012

(54) CROSS-FLOW SPIRAL HEAT TRANSFER SYSTEM

(75) Inventors: Stephen A. McCormick, Warrington, PA (US); Michael Newman, Hillsborough, NJ (US); Robert Muscato, Monmouth Junction, NJ (US)

(73) Assignee: Linde, Inc., New Providence, NJ (US)

( * ) Notice: Subject to any disclaimer, the term of this patent is extended or adjusted under 35 U.S.C. 154(b) by 1143 days.

(21) Appl. No.: 12/184,386

(22) Filed: Aug. 1, 2008

(65) Prior Publication Data

US 2009/0047404 A1 Feb. 19, 2009

Related U.S. Application Data

(60) Provisional application No. 60/964,458, filed on Aug. 13, 2007.

(51) Int. Cl.
*F25D 25/02* (2006.01)
*F25D 13/06* (2006.01)
(52) U.S. Cl. .................. 62/381; 62/63; 62/411
(58) Field of Classification Search ............... 62/63, 381, 62/404, 411
See application file for complete search history.

(56) References Cited

U.S. PATENT DOCUMENTS

| | | | |
|---|---|---|---|
| 3,345,828 A | 10/1967 | Klee et al. | |
| 3,403,527 A | 10/1968 | Berreth et al. | |
| 3,600,901 A | 8/1971 | Wagner | |
| 3,708,995 A | 1/1973 | Berg | |
| 3,952,540 A | 4/1976 | Okada et al. | |
| 4,229,947 A | 10/1980 | Klee | |
| 4,324,110 A | 4/1982 | Lovette, Jr. et al. | |
| 4,757,691 A | 7/1988 | Compagnon | |
| 5,078,120 A | 1/1992 | Hwang | |
| 5,170,631 A | 12/1992 | Lang et al. | |
| 5,203,820 A | 4/1993 | Dibbs | |
| 5,205,135 A * | 4/1993 | Lang ............................. | 62/381 |
| 5,343,714 A | 9/1994 | Kiczek et al. | |
| 5,343,715 A | 9/1994 | Lang | |
| 5,398,521 A * | 3/1995 | Baron et al. .................... | 62/381 |
| 5,452,588 A | 9/1995 | Onodera | |
| 5,522,238 A | 6/1996 | Miller | |
| 5,765,381 A | 6/1998 | Renz | |
| 5,850,781 A | 12/1998 | Kuenen | |
| 6,619,069 B1 * | 9/2003 | Persson ........................ | 62/381 |
| 6,725,674 B1 | 4/2004 | Kamm et al. | |
| 2004/0216470 A1 | 11/2004 | Thomas et al. | |

OTHER PUBLICATIONS (W/International Search Report), Nov. 5, 2008.

* cited by examiner

*Primary Examiner* — Mohammad Ali
*Assistant Examiner* — Daniel C Comings
(74) *Attorney, Agent, or Firm* — Joshua L. Cohen

(57) ABSTRACT

A heat transfer system for refrigeration and/or heating of products includes a housing having an internal chamber, a baffle, a spiral pathway around the baffle, a gas flow pathway and a blower to circulate gas along the gas flow pathway. The baffle separates the chamber into upper and lower portions. The spiral pathway includes an upper spiral pathway within the upper portion, and a lower spiral pathway within the lower portion. The gas flow pathway includes an upper gas flow pathway across the upper spiral pathway and a lower gas flow pathway across the lower spiral pathway in which gas flow in the upper and lower gas flow pathways defines a circulation loop. The width of the upper gas flow pathway and upper spiral pathway are similar, and the width of the lower gas flow pathway and lower spiral pathway are similar.

15 Claims, 2 Drawing Sheets

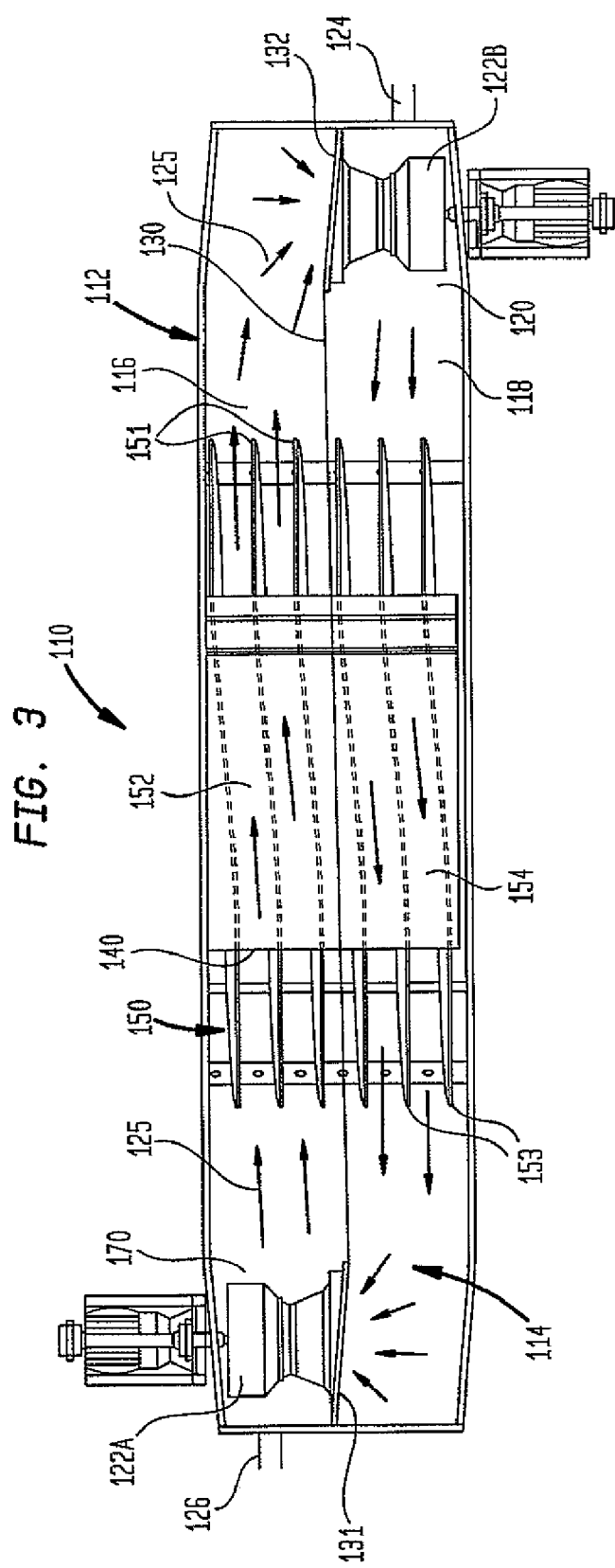

CROSS-FLOW SPIRAL HEAT TRANSFER SYSTEM

TECHNICAL FIELD

The present disclosure relates to a heat transfer system for cooling, chilling heating or otherwise removing heat from or supplying heat to products, such as for example food products.

BACKGROUND

In some refrigeration systems, a line of products to be for example refrigerated is moved through the refrigeration system, along a spiral or helical pathway through the cold or chilling region. Systems in which products to be refrigerated follow a spiral or helical pathway through the cold region are conventionally termed spiral refrigeration systems. Related systems may be used to heat products.

One type of refrigeration system used in the industry to remove heat from products is a spiral refrigeration system. Unless otherwise noted, as used herein, "spiral" refers to both spiral and helix forms.

A single pass configuration spiral refrigeration system is one in which a gas such as cryogen is directed by fans to flow among the products to be cooled. The gas is then returned from the products to the fans through return gas conveyances in the system. In existing single pass systems, the return gas conveyances may consist of ductwork which do not contain products from which it is desirable to remove heat. Since there are no products to be cooled along the return ductwork path, single pass systems lose cooling capacity due to less efficient use of process volume along with the inefficiencies associated with maintaining the environment in this ductwork space. In addition, the large external return gas conveyors and ductwork add bulk and footprint area to known systems; further reducing cost-effectiveness of such systems.

It therefore remains desirable to provide for a more efficient system to cool and/or chill products, and heat and/or cook products in a spiral heat transfer system.

BRIEF DESCRIPTION OF THE DRAWINGS

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

FIG. 3 shows a cross-section elevation view of another embodiment of a cross-flow spiral heat transfer system.

DETAILED DESCRIPTION

Discussion of the heat transfer system embodiments is with respect to cooling and heating a product, and reference to or refrigeration system could similarly include references to a heating system.

Variables defining a spiral pathway include, but are not limited to, diameter, height and pitch. As used herein, a "tier" is the part of a helix corresponding to one full thread of the spiral.

In all the embodiments herein, return of the gas flow occurs within the product processing zone of the system, not at an exterior of the system.

In all embodiments, the present system can also be used in a manner of heat transfer to also heat or cook products, such as food products. The higher the velocity of the gas being employed to pass over the products, the greater the increase in heat transfer at the products.

In all embodiments, a drum which moves the spiral conveyor belt cooperates with the spiral belt to create a bifurcated pathway for the gas, which pathway has a width equal to the width of the conveyor belt upon which the products are transported so that heat transfer gases are efficiently used.

In the refrigeration system embodiments herein in which heat is transferred from a product to be refrigerated to a flowing refrigeration fluid, one mode of cooling the product to be refrigerated is forced convection. In forced convection, the heat transfer coefficient is a function of the flow velocity of the refrigeration fluid. Heat transfer for cooling objects also includes a factor that the higher the velocity of gas used to effect heat transfer, the greater the heat transfer rate.

A refrigeration fluid may also be called a "cryogen". As used in refrigeration, cryogen gas may be as cold as −250° F., or as dictated by the minimum temperature at which the gas exists in its gaseous state.

In addition to the efficiency benefits achieved by reducing disused regions, the size of the freezing system may be made significantly smaller because the refrigeration medium, such as a gas, is returned to the main blowers along the product pathway or in the product processing zone. Dedicated external return chambers and related ductwork are not necessary. This results in a savings in overall system cost. In addition, a lower amount of structural material is required to be cooled down which results in a secondary efficiency improvement.

Figure 1:
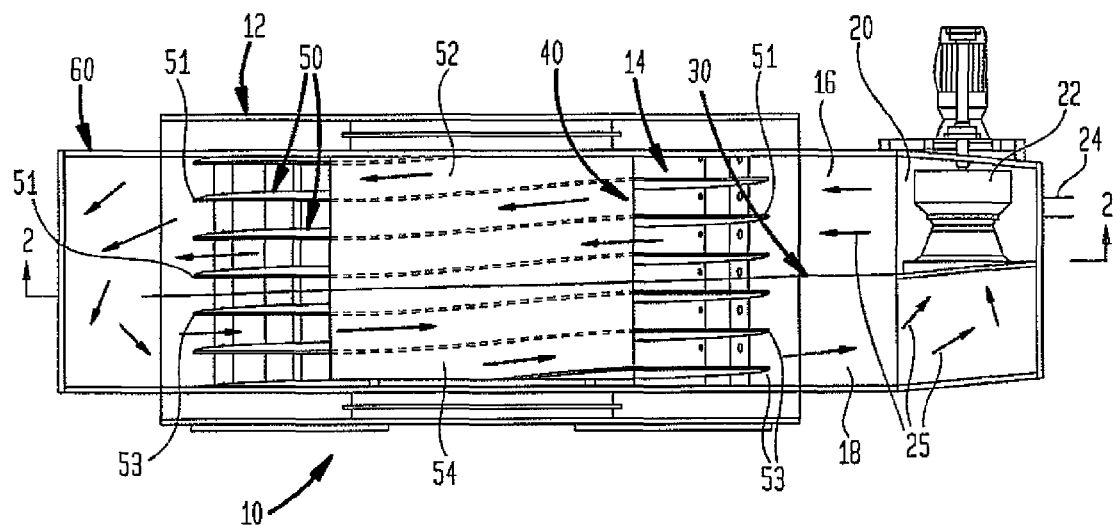
FIG. 1 shows a cross-section elevation view of an embodiment of a heat transfer system.
Figure 2:
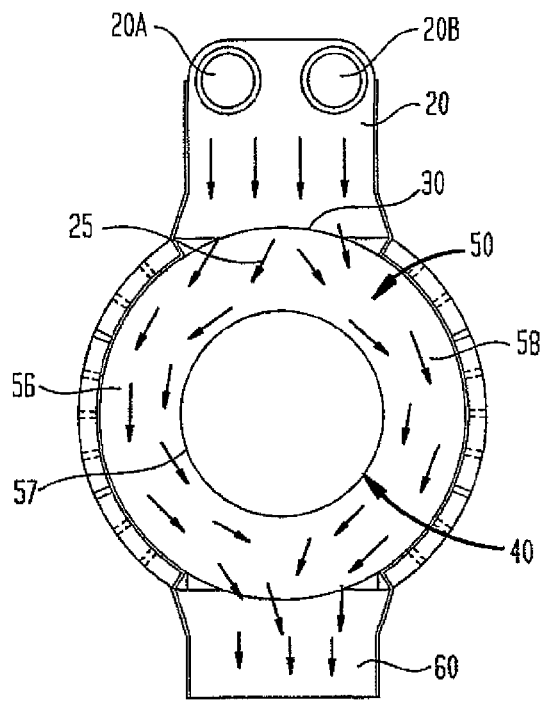
FIG. 2 shows a top cross-section plan view of the embodiment of FIG. 1.

Referring to FIGS. 1 and 2, FIG. 1 shows a two-pass or dual-pass cross flow spiral heat transfer system 10. The system 10 is used to cool or freeze, or heat or bake products (not shown) such as food products. The system 10 includes a housing 12 with an internal cavity or chamber 14. The housing 12 is constructed of any suitable material for freezing or heating applications. By way of example, cryogenic gas (as low as but not limited to −250° F.) from a blower chamber 20, is pressurized and passed around an exterior of a top half of a drum 40 and along and through spiral belt 50 to contact the products. A top portion of the belt 50 includes tiers 51. Gas flow is indicated by arrows 25. A baffle 30 separates upper 16 and lower 18 portions of the chamber 14 and prevents the gas from entering into bottom tiers 53 of the belt 50. The baffle 30 may be made from various materials that are substantially impervious to prevent the flow of gas. The gas 25 flows to a return chamber 60, where it turns and is diverted back through the lower portion 18 of the freezer (bottom tiers 53 of belt) and into an inlet of the blower chamber 20, where the gas 25 is recirculated by blower or fan 22.

The spiral belt 50 provides for a spiral pathway. The spiral pathway includes an upper pathway 52 of the tiers 51 within the upper portion 16; and a lower pathway 54 of the tiers 53 within the lower portion 18. The product is transported upon the tiers 51, 53 of the belt 50. The drum 40 drives the belt 50 along the spiral or helical path.

The baffle 30 separates the upper pathway 52 from the lower pathway 54. The baffle 30 works in conjunction with the drum 40 to create the upper pathway 52 and the lower pathway 54 to each have a width equal to a width of the belt 50. This is because gas flow 25 does not flow through the drum 40, but rather is bifurcated by the drum 40 as shown in FIG. 2 into two separate streams (discussed below) flowing about and exterior to the drum 40 and then into the return chamber 60. The baffle 30 is continuous around the drum 40, as shown more clearly in FIG. 2, and extends into the blower chamber 20 and the return chamber 60. In this manner of construction, the gas flow 25 is directed from the blower chamber 20 across and onto the product being transported on the tiers 51 of the belt 50 in the upper pathway 52, through the return chamber 60 and then back in counter flow to the lower pathway 54 for further contact with the product on the conveyor belt 50, whereupon the gas 25 flows to the blower chamber 20 for continuous circulation. Replenishment of fresh cryogen to the system 10 is provided to the blower chamber 20 via conduit 24. The conduit 24 is in communication with a source of cryogen (not shown) such as for example carbon dioxide ($CO_2$), nitrogen ($N_2$), etc. The conduit 24 may be disposed at other locations of the system 10 for introduction of cryogen (or heating fluid) thereto.

FIG. 1 shows the upper pathway 52 to be a helical path comprising a plurality of tiers such as for example three tiers 51 of the belt 50, and the lower pathway 56 to be a helical path comprising a plurality of tiers such as for example three tiers 53 of the belt 50, although the number of tiers is merely illustrative and not intended as a limitation. The upper pathway 52, the return chamber 60, the lower pathway 54, and the blower chamber 20 define a circulation loop for the gas 25. Blower means 22 to induce gas flow is provided, and such can be a fan, blower, compressor or any other suitable means. The blower means 22 is constructed and arranged for operation in or communication with the blower chamber 20.

In operation, and referring to FIGS. 1 and 2, a cryogen is provided to the blower chamber via conduit 24 and upon sufficient "charging" of the system 12 with the cryogen, the conduit is closed. Blower means, which as shown in FIG. 2 can be a pair of blowers or fans 20A and 20B, provide the necessary force to initiate and sustain a flow of the gas 25 into and along the upper pathway 52 such that the gas flow 25 contacts the tiers 51 of the conveyor belt 50 upon which the product is being transported. The conveyor belt 50 is porous, i.e. can be of mesh construction or grid-like construction, to thereby facilitate the gas 25 flowing between and among the tiers 51 of the conveyor belt 50 in the upper pathway 52. The gas flow in the upper pathway 52 is prevented from communicating with the lower pathway 54 by virtue of the disposition of the baffle 30 in the chamber 14 of the housing 12. The gas flow 25 in the upper pathway 52 is in counter-flow to the gas flow 25 in the lower pathway 54.

As shown in FIG. 2, the drum 40 is disposed substantially at the center of the chamber 14 with the baffle 30 extending in the chamber 14 around the drum 40. The drum can be hollow or solid, but an exterior wall 57 of the drum 40 is impervious to the gas flow 25. The gas under force exerted by the blowers 20A, 20B is directed in the return chamber 60 downward away from the upper pathway 52 into the lower pathway 54 to subsequently contact food product on the tiers 53 of the conveyor belt 50. It should be noted that the baffle 30, in an embodiment where the blowers 20A and 20B are disposed at the same side of the housing 12, may be angled slightly downward toward the bottom of the housing 12, as shown in FIG. 1, to facilitate movement of the gas flow to the return chamber 60 and back through the lower pathway 54 to the blower chamber 20.

In effect, the product is subjected to a two-pass or dual-pass flow of the gas 25. The cryogen gas flow 25 is restricted for flow across a width of the tiers 51, 53 of the conveyor belt 50, such that none of the cryogen gas is wasted on heat transfer at unnecessary portions of the freezer system 10.

The construction and operation of the embodiment shown in FIGS. 1 and 2 uses only approximately 50% of the amount of cryogen flow as a single pass refrigeration system would require, due to the arrangement of the baffle 30 and its cooperation with the drum 40, segregation of the upper pathway 52 and lower pathway 54, and the recirculation of the gas flow 25 between and among the blower chamber 20 and the return chamber 60. This dual-pass configuration of the spiral refrigeration system 10 also requires less power, whereby the reduced power reduction leads to additional operating efficiencies. Initial testing has shown a 35% reduction in overall power necessary in order to power the system 10, with a cryogen efficiency improvement of at least 15% less use in the gas 25 as compared to single pass systems.

In the cross-flow spiral refrigeration system 10 of FIG. 1, the refrigeration medium makes two passes through the product pathway, once in the upper pathway 52, and once in the lower pathway 54. In the system 10 shown, the amount of refrigeration medium that flows through the upper pathway 52 is the same as the amount that flows through the lower pathway 54. The present system 10 provides for an even constant gas flow and velocity in the upper and lower pathways 52, 54. The system 10 is constructed and arranged to provide for continuous, uniform passes of the cooling medium over the product on the belt 50. Alternatively, system 10 as a heat transfer system provides for the continuous, uniform passing of a heating or cooking gas over the product on the belt 50.

Thus, the two-pass configuration of the present system 10 may require only about 50% of the conventional airflow used in conventional airflow schemes, such as one-pass flow configurations.

In addition to the operational efficiency benefits achieved by the system 10, the size of the freezing system 10 may be made significantly smaller because the gas is returned to the blowers 20A, 20B through the upper and lower pathways. Separate gas return chambers and ductwork are not necessary, thereby providing for a smaller "footprint" for the system 10. This results in a significant savings in overall system cost.

FIG. 2 illustrates a cross-sectional plan view of the embodiment of a cross-flow spiral refrigeration system 10 in FIG. 1.

As shown in FIG. 2, the gas flow 25 enters the upper pathway 52 and is bifurcated by the drum 40 into separate branches 56, 58 of gas flow to flow around the drum 40. Subsequently, the branches 56, 58 reunite and flow into the return chamber 60. This also occurs in the lower pathway 54 as well. That is, the returning gas flow 25 from the return chamber 60 is prevented from returning to the upper pathway 54 by the baffle 30. The gas flow 25 is similarly bifurcated by the drum 40 into separate branches in the lower pathway 54 (which would correspond to the branches 56, 58 in the upper pathway 52) as it is returned to the blower chamber 20. The cross-sectional width of branch 56 is equal to the width of the branch 58, and the sum of the cross-sectional volumes of branch 56 and 58 is equal to the cross-sectional volume of the original upper pathway 52. The width of the branch 56 is equal to the width of the tier 51 of the belt 50, and the width of the branch 58 is equal to the width of the tier 51 of the belt. Similar dimensions exist between and among the tiers 53 of the belt 50 and the related branches in the lower pathway 54.

FIG. 3 shows another embodiment, wherein a two-pass configuration of the present spiral refrigeration system is shown generally at 110 and includes two blower chambers 120, 170. In this configuration, higher velocities as well along the belt result in higher heat transfer coefficients for the product, whether the product is being heated or cooled.

The system 110 shown in FIG. 3 includes a housing 112 having an internal space or chamber 114 therein. The system 110 has many features similar to the system 10 and operates in a similar manner.

Disposed within the space 114 is a drum 140 about which a spiral conveyor belt 150 is constructed and arranged for operation, the belt 150 being driven along the spiral or helical path by the drum 140. The drum 140 is impervious to fluid flow and bifurcates the gas flow 125 similarly to that which occurs with respect to the embodiment of FIGS. 1 and 2. The conveyor belt 150 transports products (not shown), such as food products along the internal chamber 114 for cooling and/or freezing by the system 110. Similar to the embodiment discussed above with respect to FIGS. 1 and 2, the embodiment in FIG. 3 is also a heat transfer system and can be used to heat and cook products, as well as freeze products.

The internal chamber 114 consists of an upper portion 116 and a lower portion 118. The upper portion 116 and lower portion 118 are segregated from each other by a baffle 130 which extends along the internal chamber 114 of the housing 112. The upper portion 116 of the internal chamber 114 contains the upper pathway 152, while the lower portion 118 of the internal chamber 114 contains the lower pathway 154. The conveyor belt and its tiers 151, 153 move between the upper and lower pathways 152, 154.

Disposed in the upper portion 116 of the internal chamber 114 is a blower or fan 122A, while disposed at the lower portion 118 of the internal chamber 114 is another blower or fan 122B. Fans 122A, 122B may be arranged at different sides of the housing 112, such as at opposed sides of the housing 112. In addition, one of the fans, such as the fan 122A, is disposed in the upper portion 116, while the other blower such as the fan 122B is disposed in the lower portion 118. The baffle 130 surrounds the drum 140 and prevents fluid flow 125 between and among the upper portion 116 and the lower portion 118, except for areas of the baffle 130 shown generally at 131 and 132. The areas 131, 132 are those areas permitting gas flow 125 to occur between the lower portion 118 and the upper portion 116. This can be as a result of the construction of the baffle 130 extending up to only that point in the interior space 114 where the baffle meets the fans 122A, 122B, or apertures (not shown) may be provided in the baffle 130 to enable the gas flow 125 to be drawn from the lower portion into the upper portion via the fan 122A, and from the upper portion 116 into the lower portion 118 via the fan 122B. In either arrangement there is provided the continuous circulatory effect between and among the upper and lower portions 116, 118.

The conveyor belt 150 is arranged to extend between the lower portion 118 and the upper portion 116. At least one and preferably a plurality of the tiers 151 of the belt 150 are disposed at any given time in the upper portion 116. At least one and preferably a plurality of the tiers 153 of the belt 150 are disposed in the lower portion 118 at any given time.

As shown in FIG. 3, movement of the belt 150 causes the tiers 151, 153 to transport the product between the upper portion 116 and the lower portion 118, but in any event the gas flow 125 assures that the products receive a continuous, uniform dual pass flow of the cryogen gas as the products are transported by the belt 150 between and among the portions 116, 118.

Although the perspective of FIG. 3 shows a pair of fans 122A, 122B, it should be understood that owing to said perspective there could be a pair of fans at each opposed side of the housing 112.

Conduits 124, 126 are in communication with the blower chambers 120, 170 to "charge" the system 110 with a cooling or heating fluid as necessary. The conduits 124, 126 are connected to a source (not shown) of cooling or heating fluid and may be in communication with other areas of the chamber 114.

The system 110 shown in FIG. 3, due to the blower arrangement 122A, 122B, does not necessitate a grade or angle of the conveyor belt 150 to be other than at the horizontal with respect to the housing 112, although such a grade or angle can be employed if required for a particular processing application.

In the embodiments of FIGS. 1-3, the fans 22, 20A, 20B, 122A, 122B exert a sufficient force of the fluid flow 25, 125 such that same does not displace the products from the tiers 51, 53, 151, 153.

In the embodiments shown in FIGS. 1-3, the systems 10, 110 function as heat transfer systems. That is, in effect, these heat transfer systems 10, 110 can be employed to heat or cook products, such as food objects, just as the systems 10, 110 can be employed to cool and/or freeze products as discussed above. In other words, instead of the gas flow 25 being a cryogen for example, said gas flow 25 could consist of high temperature air or other gases to warm, heat or cook products, such as food products being transported for processing in the system 10, 110. Accordingly, the subject matter of the present invention is not limited to cooling and freezing, but rather can be employed to heat or cook products such as food products.

While the present subject matter has been described above in connection with illustrative embodiments, as shown in the various figures, it is to be understood that other similar embodiments may be used or modifications and additions may be made to the described embodiments for performing the same function without deviating therefrom. Further, all embodiments disclosed are not necessarily in the alternative, as various embodiments may be combined to provide the desired characteristics. Variations can be made without departing from the spirit and scope of the invention. Therefore, the cross-flow spiral heat transfer system should not be limited to any single embodiment, but rather construed in breadth and scope in accordance with the attached claims.

What is claimed is:
1. A heat transfer system for a product, comprising:
a housing having an internal chamber;
a baffle substantially impervious to gas flow therethrough and being disposed in the internal chamber for separating the internal chamber into upper and lower portions;
a spiral pathway, comprising:
an upper pathway within the upper portion, wherein each of the upper pathway and the upper portion has a width equal to the other, and
a lower pathway within the lower portion, and wherein each of the lower pathway and the lower portion has another width equal to the other;
a gas flow pathway, comprising:
an upper gas flow across the upper pathway, and
a lower gas flow across the lower pathway and in counter-flow to the upper gas flow, wherein the upper gas flow and lower gas flow define a circulation loop;
a drum disposed in the internal chamber extending between the upper and lower portions, the drum including an outer side wall impervious to the upper and lower gas flows and about which is arranged the baffle and the spiral pathway; and
at least one blower operatively associated with the internal chamber to induce the upper and lower gas flows along the circulation loop.

2. The system according to claim 1, wherein the upper gas flow and the lower gas flow are of substantially uniform velocity.

3. The system according to claim 1, wherein the spiral pathway comprises a conveyor belt arranged in a spiral configuration wherein at least one of a plurality of tiers of the spiral configuration is in the upper pathway and at least another of the plurality of tiers of the spiral configuration is in the lower pathway.

4. The system according to claim 1, wherein the at least one blower is disposed in at least one of the upper and lower portions.

5. The system according to claim 1, wherein the at least one blower comprises at least one pair of fans disposed in at least one of the upper and lower portions.

6. The system according to claim 1, wherein the at least one blower comprises a first fan disposed in the upper portion and a second fan disposed in the lower portion.

7. The system according to claim 6, wherein the first and second fans are disposed at opposed sides of the housing.

8. The system according to claim 1, wherein the upper and lower gas flows comprise gas selected to reduce a temperature of the product.

9. The system according to claim 8, wherein the gas is a cryogenic gas selected from carbon dioxide, nitrogen and combinations thereof.

10. The system according to claim 1, wherein the upper and lower gas flows comprise a gas selected to heat the product.

11. The system according to claim 1, wherein the circulation loop is arranged in the internal chamber.

12. The system according to claim 1, wherein the product is a food product.

13. A method of providing heat transfer to a product, comprising:
    establishing a fluid circulation loop between a first fluid flow pathway and a second fluid flow pathway, wherein the first fluid flow pathway is adjacent to and separated from the second fluid flow pathway by a barrier substantially impervious to heat transfer fluid;
    moving the heat transfer fluid along the first fluid flow pathway in counter-flow to moving the heat transfer fluid along the second fluid flow pathway;
    providing a spiral pathway, the spiral pathway comprising a first spiral pathway within the first fluid flow pathway wherein each of the first spiral pathway and the first fluid flow pathway have a width equal to the other, and a second spiral pathway within the second fluid flow pathway wherein each of the second spiral pathway and the second fluid flow pathway have another width equal to the other;
    moving the spiral pathway around a drum having an outer side wall adjacent the first and second fluid flow pathways and inhibiting the heat transfer fluid in said pathways from flowing through said outer side wall;
    introducing the product to the spiral pathway; and
    flowing the heat transfer fluid over the product in the spiral pathway.

14. The method according to claim 13, wherein the heat transfer fluid is selected from a heating gas and a cooling gas.

15. The method according to claim 13, wherein the product is a food product.

* * * * *